Figure 5:
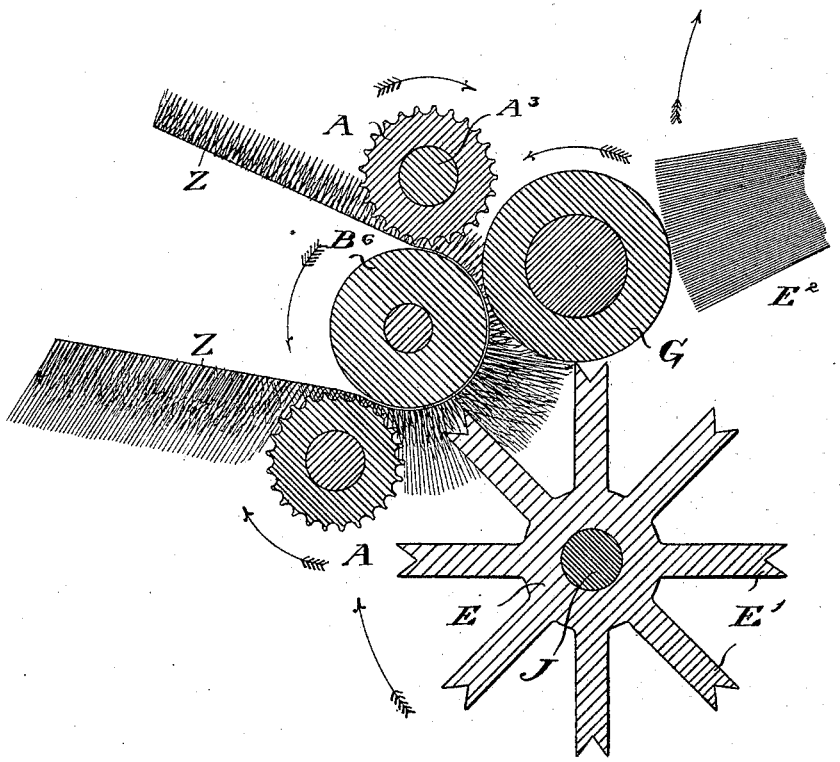

(No Model.) 4 Sheets—Sheet 1.
J. & F. TAYLOR.
MACHINE FOR PULLING OR PLUCKING RABBIT SKINS.
No. 606,255. Patented June 28, 1898.
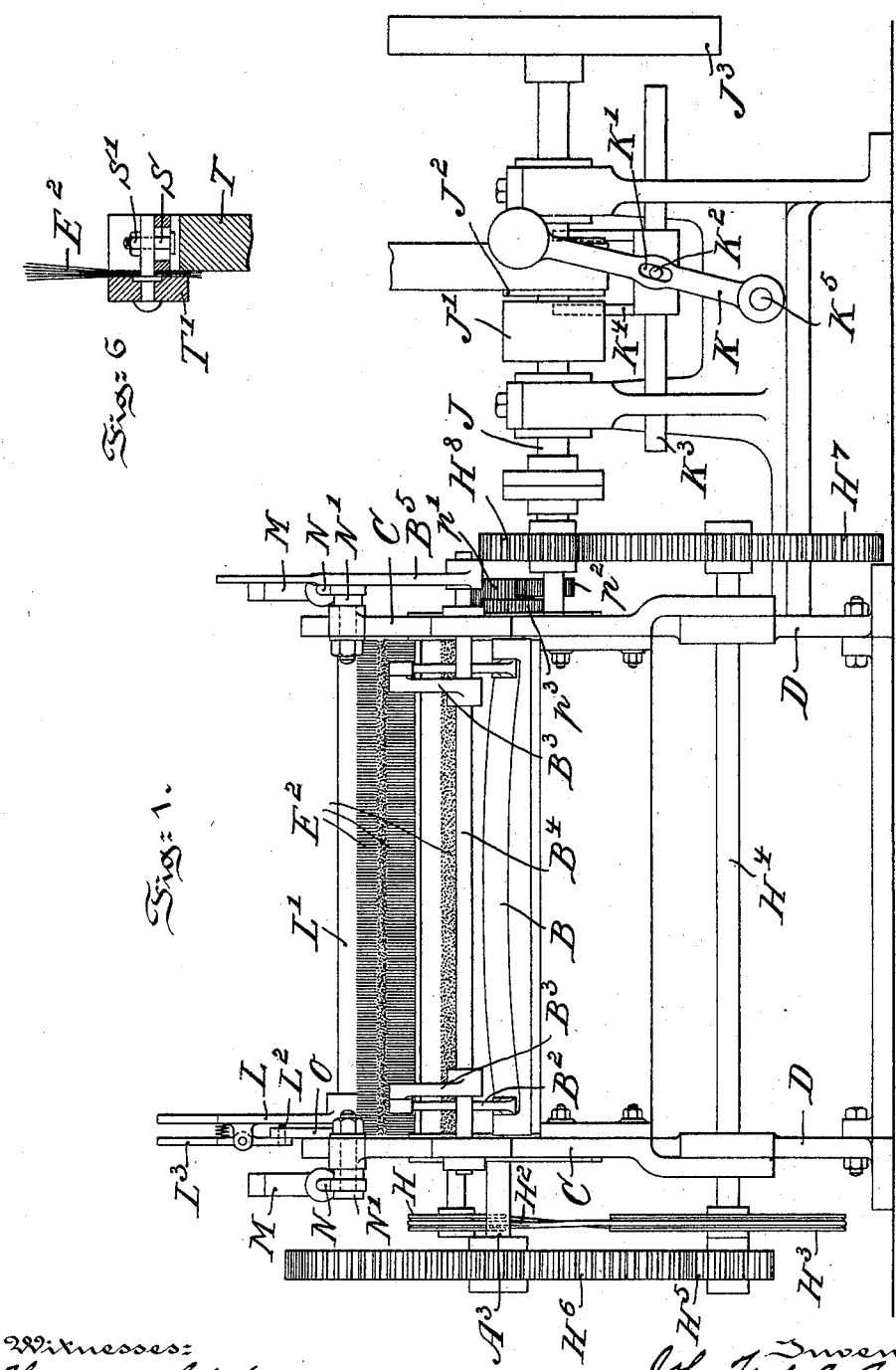

(No Model.) 4 Sheets—Sheet 2.
J. & F. TAYLOR.
MACHINE FOR PULLING OR PLUCKING RABBIT SKINS.
No. 606,255. Patented June 28, 1898.
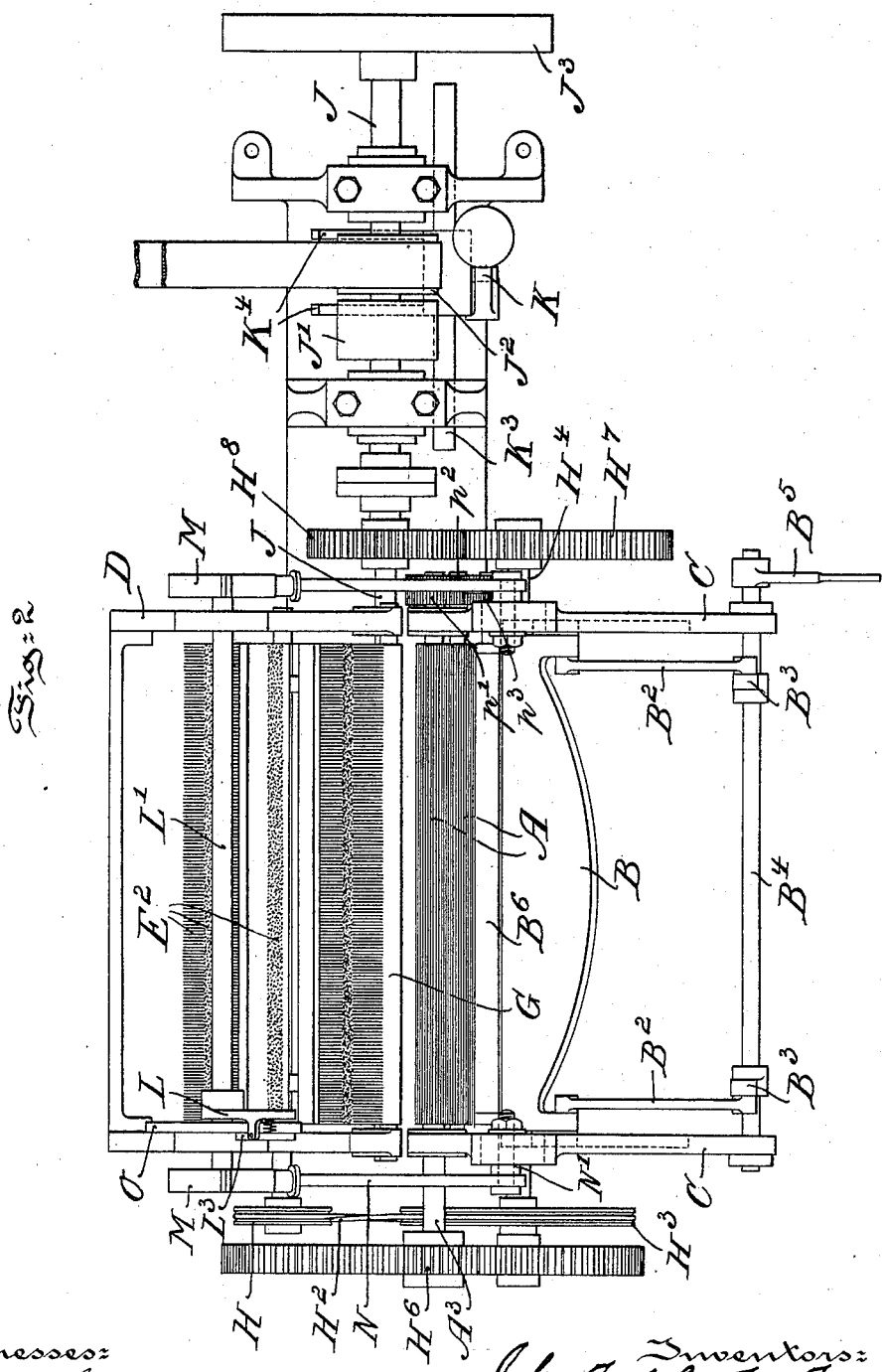

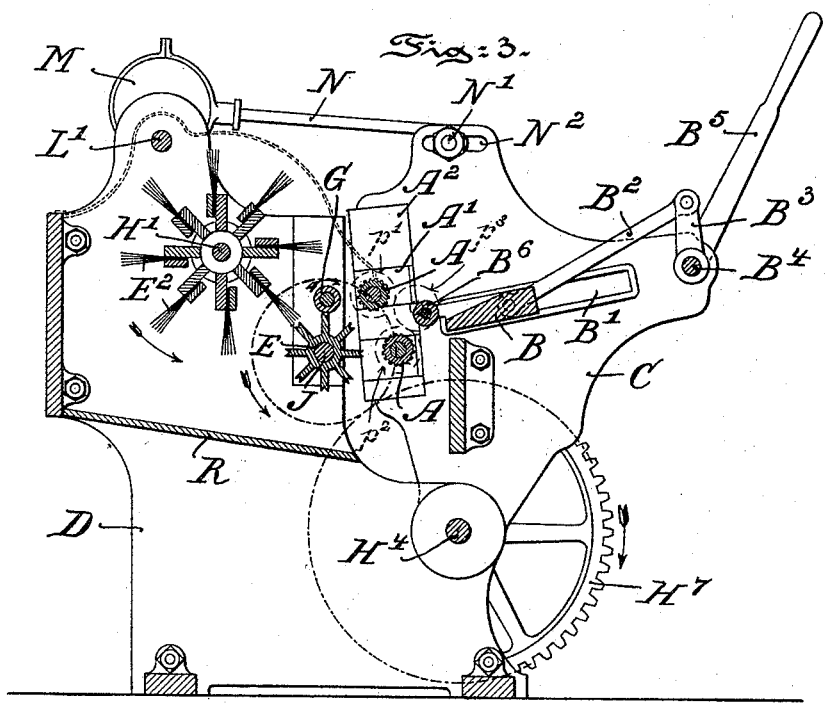
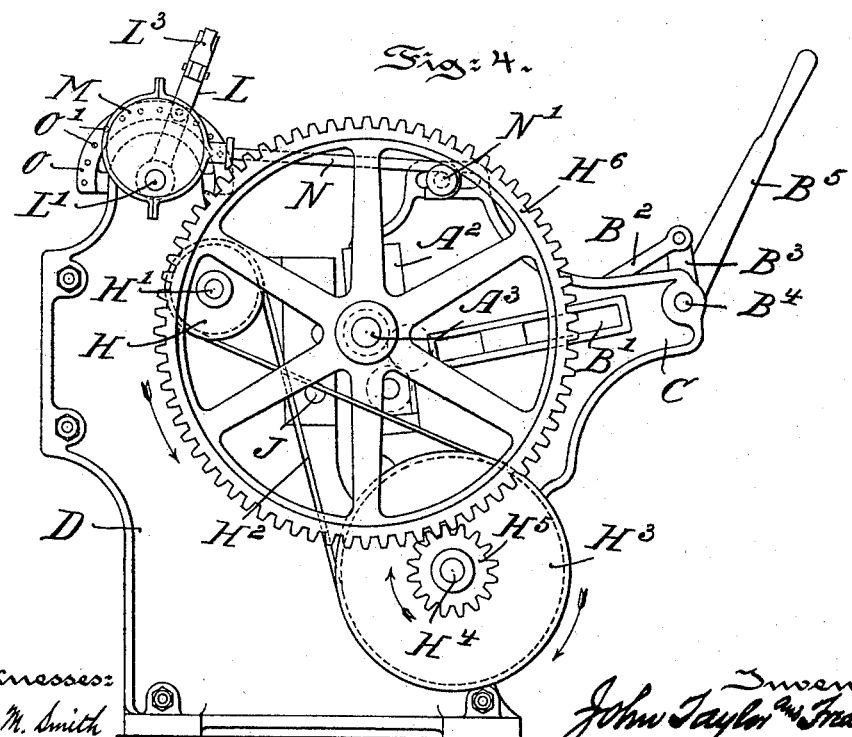

(No Model.) 4 Sheets—Sheet 4.
J. & F. TAYLOR.
MACHINE FOR PULLING OR PLUCKING RABBIT SKINS.
No. 606,255. Patented June 28, 1898.

UNITED STATES PATENT OFFICE.

JOHN TAYLOR AND FRED TAYLOR, OF LEEDS, ENGLAND.

MACHINE FOR PULLING OR PLUCKING RABBIT-SKINS.

SPECIFICATION forming part of Letters Patent No. 606,255, dated June 28, 1898.

Application filed January 9, 1897. Serial No. 618,580. (No model.) Patented in England July 15, 1896, No. 15,665.

*To all whom it may concern:*

Be it known that we, JOHN TAYLOR and FRED TAYLOR, subjects of the Queen of Great Britain, residing at Leeds, in the county of York, England, have invented new and useful Improvements in Machines for Pulling or Plucking Rabbit and Similar Skins, (for which we have obtained Letters Patent of Great Britain, No. 15,665, dated July 15, 1896,) of which the following is a specification.

Our invention has relation to a machine for removing from rabbit and similar skins the long coarse hairs by a pulling or plucking operation without disturbing the finer and shorter hairs composing the fur of the skin, and in such connection it relates particularly to the construction and arrangement of such a machine.

Our invention consists of a machine provided with feed-rollers, which may or may not be fluted, in conjunction with a feed apron or platform having at one end a roll adapted to be moved to a position between the said rollers to feed a hide or skin to a plucking or pulling wheel consisting of a series of arms having V-shaped indented ends adapted to strike the long hairs and compress them against or upon a roll preferably covered with india-rubber in a manner that they are plucked or pulled from the hide or skin and deposited on the surface or periphery of the india-rubber-covered roller, from which they are swept by a revolving brush.

Our invention further consists of a machine for plucking long hairs from rabbit or other skins when constructed and arranged in substantially the manner hereinafter described and claimed.

The nature, scope, or characteristic features of our invention will be more fully understood from the following description, taken in connection with the accompanying drawings, forming part thereof, in which—

Figure 1 is a front elevational view of a machine embodying main features of our invention. Fig. 2 is a top or plan view thereof. Fig. 3 is a central vertical section of the machine. Fig. 4 is an elevation of the left-hand end of the machine. Fig. 5 is a diagrammatic view, drawn to a larger scale, illustrating the relation and arrangement of the feed-rollers, the plucking-wheel, the india-rubber-covered roll, and the brush, together with the roll mounted on the apron or table and the hide or skin presented by the same to the feed-rollers; and Fig. 6 is an enlarged detail view showing the preferred construction and arrangement of the revolving brush.

Referring to the drawings, A A are feed-rollers, which, by preference, are fluted, and B is a feed apron or table adapted to be slid in the frame C, which is movable toward or away from the main or stationary frame D, the movable frame C being hinged or pivoted upon the shaft $H^4$, having bearings in the stationary frame D. The feed-rollers A are carried on bearings A', fixed in blocks $A^2$, and the apron or table B is movable in the slides B' of the frame C toward or away from the rollers A by means of links $B^2$ and levers $B^3$, the latter secured to said links $B^2$ and carried by an axle or rock-shaft $B^4$, adapted to be operated by the hand-lever $B^5$. At the free end of the table or apron B is located a roll $B^6$, preferably covered with india-rubber, and around this roll the skin Z is drawn in order that it may be presented to the feed-roller A, as illustrated in Fig. 5.

The plucking or pulling wheel E consists of a series of arms E', secured at one end to a shaft J and having their free ends indented or hollowed out preferably in V shape. Above the wheel E is located a roll G, preferably covered with india-rubber, and the V-shaped ends of the arms E' are adapted to impinge against the long hairs and periphery of this roll G and pull or pluck them from the skin Z. The exterior surface or periphery of the roll G is also swept or cleansed by the revolving brush $E^2$, the shaft H' of which is driven by a pulley H by means of a band $H^2$ from a pulley $H^3$, which is carried by the main shaft $H^4$. This shaft $H^4$ is provided at one end with a pinion $H^5$, which gears with a spur-wheel $H^6$, secured to and driving the shaft $A^3$ of the upper feed-roller A. The shaft $H^4$ has at its opposite end a spur-wheel $H^7$, gearing with a pinion $H^8$, carried by the shaft J, which is provided with the fast and loose pulleys J' and $J^2$ and also with a driving-wheel $J^3$. The device for shifting the belt from the fast to the loose pulley, or vice versa, may be briefly described as follows: It consists of the weighted lever K, slotted at K' and working on the pin $K^2$ and pivoted at one end, as at $K^5$. The pin $K^2$ is secured to a sliding bar $K^3$, carrying the fork $K^4$, and movement of the lever K is transferred by the pin $K^2$ to the bar $K^3$ and fork $K^4$ to the strap or belt. The means for adjusting the movable frame C with respect to the fixed frame D consists, essentially, of a spring-lever L, secured at one end to a shaft $L'$, movable in the frame D, and having at either end of the machine the eccentric M, connected by rods N to pins or studs $N'$, adapted to be secured in slots $N^2$ of the frame C. The lever L carries a pin $L^2$, controlled by a handle $L^3$, which pin is adapted to enter one of a series of holes $O'$, formed in a quadrant-plate O, secured to the frame D.

The distance between the flexible covered roller $B^6$ and the plucking-wheel E must be varied to suit the length of the coarse hair to be plucked. This variation is accomplished by turning the lever L and eccentric M to such a position that the frame C will approach or recede from the frame D the required distance and in then locking the lever L to the quadrant-plate O by permitting the pin $L^2$ to enter a hole of the said plate O. The position of the eccentrics M will, through the rods N and pins $N'$, cause the frame C to move the required distance, thus bringing the roll $B^6$ and feed-rollers A into required relationship with respect to the plucking-wheel E, brush $E^2$, and roll G. The brush $E^2$ is constructed, preferably, as illustrated in Fig. 6, and consists of a series of arms or spokes T, to each of which is secured by bolts or pins S $S'$ a wooden bar $T'$, carrying the bristles $E^2$.

The operation of the machine hereinbefore described is as follows: In order to pull the longer and less valuable hairs from the skin Z, said skin is passed through the machine, as indicated by the arrows in Fig. 5, being supported by the table B and passing around the roll $B^6$. By operating the handle $B^5$ the skin is pushed or forced between the feed-rolls A, which are geared together by the pinions $p'$, $p^2$, and $p^3$. The pinions $p'$ and $p^3$ are secured, respectively, to the ends of the shafts carrying the upper and lower rollers A. The intermediate pinion $p^2$ gears with the two and is mounted to revolve freely upon a stud secured to the frame C. The skin Z thus receives motion and is caused to pass in front of the wheel E, which, rapidly rotating in conjunction with the india-rubber-covered roll G, plucks the long hair from the skin, the hair being deposited upon the said roll G, from which it is swept by the brush $E^2$ and is deposited on the floor R in rear of the machine, from which it may be removed in any suitable manner. After the skin has been passed through the machine in one direction it may, if necessary, be removed and reversed to remove such long hair as has not been reached during the first operation of the machine.

Having thus described the nature and objects of our invention, what we claim as new, and desire to secure by Letters Patent, is—

1. In a machine of the character described, two feed-rollers, a plucking-wheel, a flexible covered roll G, a feed-apron provided with a roll around which the skin is adapted to be moved, mechanism for moving the feed-apron and roll to a position between the feed-rollers and a plucking-wheel having a series of arms, the ends of which are V-shaped and adapted to engage with the long hairs of the skin and flexible covered roll G, when the apron-roll is between the feed-rollers, substantially as and for the purposes described.

2. In a machine of the character described, a fixed main frame, a movable frame hinged thereto, two feed-rollers having bearings in said movable frame, a feed-apron provided with a roll about which the skin is placed, said apron and roll being movable in said movable frame, a plucking-wheel, a flexible covered roll G, and a revolving brush all supported in the fixed frame, said wheel adapted to deposit hair from the skin upon the roll G, and said brush adapted to remove said hair from said roll G, and means for adjusting the movable frame with respect to the fixed frame, substantially as and for the purposes described.

3. In a machine of the character described, two feed-rollers, a flexible covered roll, a feed apron or platform carrying a roll upon which the skin is supported, means for shifting said apron and roll to bring the skin between the two feed-rollers, a plucking-wheel adapted to impinge on the long hairs of the skin and flexible covered roll, a brush adapted to remove the hair from the flexible covered roll and deposit it at the end of the machine opposite to that in which the skin travels, substantially as and for the purposes described.

JOHN TAYLOR.
FRED TAYLOR.

Witnesses:
W. M. HUNTER,
W. MASON.